United States Patent [19]
Vallerand

[11] Patent Number: 5,722,714
[45] Date of Patent: Mar. 3, 1998

[54] WIND DISPERSION APPARATUS FOR PICKUP TRUCKS

[76] Inventor: Ivan Vallerand, 46 Lakeview Ave., Waltham, Mass. 02154

[21] Appl. No.: 329,208

[22] Filed: Oct. 26, 1994

[51] Int. Cl.⁶ .................................................. B62D 35/00
[52] U.S. Cl. .................................. 296/180.1; 296/57.1
[58] Field of Search ..................... 296/50, 51, 57.1, 296/180.1

[56] References Cited

U.S. PATENT DOCUMENTS

| | | | |
|---|---|---|---|
| 4,451,075 | 5/1984 | Canfield | 296/180.1 X |
| 4,506,870 | 3/1985 | Penn | 296/180.1 |
| 4,585,263 | 4/1986 | Hesner | 296/180.1 |
| 4,884,838 | 12/1989 | Slater | 296/180.1 |
| 5,069,498 | 12/1991 | Benchoff et al. | 296/180.1 |

Primary Examiner—Joseph D. Pape

[57] ABSTRACT

A wind deflector for dispersing the wind out of the truck bed of a pickup truck includes a top plate a first panel hingedly connected to the top plate and a second panel hingedly connected to the first panel. The top plate is fixedly mounted on the tailgate of the pickup truck by a pair of bolts and pair of locking knobs are mounted on the second panel for removably securing the second panel to either the tailgate, or the floor of the truck bed. When the wind deflector is secured to the floor of the truck bed, the wind deflector serves to deflect away air that would normally hit up against the tailgate when the truck is moving. At the same time, the space between wind deflector and tailgate can be used as a storage compartment.

2 Claims, 2 Drawing Sheets

WIND DISPERSION APPARATUS FOR PICKUP TRUCKS

BACKGROUND OF THE INVENTION

The present invention relates to a wind deflector for use in removing wind pressure in the bed of a pickup truck. The present invention also relates to a tailgate for a pickup truck which is designed to relieve the wind pressure in the bed of the truck.

As can be appreciated, wind hitting up against the tailgate in a pickup truck as the truck moves serves to counteract forward movement of the truck.

Accordingly, it is an object of this invention to provide a device which can be attached to the tailgate of an open top pickup truck for use in diverting wind pressure in the bed of the truck as the truck moves.

It is another object of this invention to provide a tailgate for an open top pickup truck which is constructed to reduce wind pressure in the bed of the truck as it moves.

SUMMARY OF THE INVENTION

According to one version of this invention there is provided a wind deflector for a pickup truck having a truck bed, the truck bed including a floor, a pair of spaced apart sidewalls and a tailgate, the wind deflector comprising a top plate, means for securing the top plate to the tailgate, a first panel hingedly connected to the top plate, a second panel hingedly connected to the first panel, and means on the second panel for removably securing the second panel to either the tailgate or the floor of the truck bed.

According to another version of the invention, there is provided a wind deflector for a pickup truck having a truck bed, the truck bed including a floor, a pair of spaced apart sidewalls and a tailgate, the wind deflector comprising a sheet of material having a top portion shaped to fit over the top of the tailgate and a bottom portion, means for securing the top portion of the sheet to the tailgate and means on the bottom portion for removably securing the bottom portion to either the tailgate or the floor of the truck bed.

Various features and advantages will appear from the description to follow. In the description, reference is made to the accompanying drawings which forms a part there of, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

Figure 1:
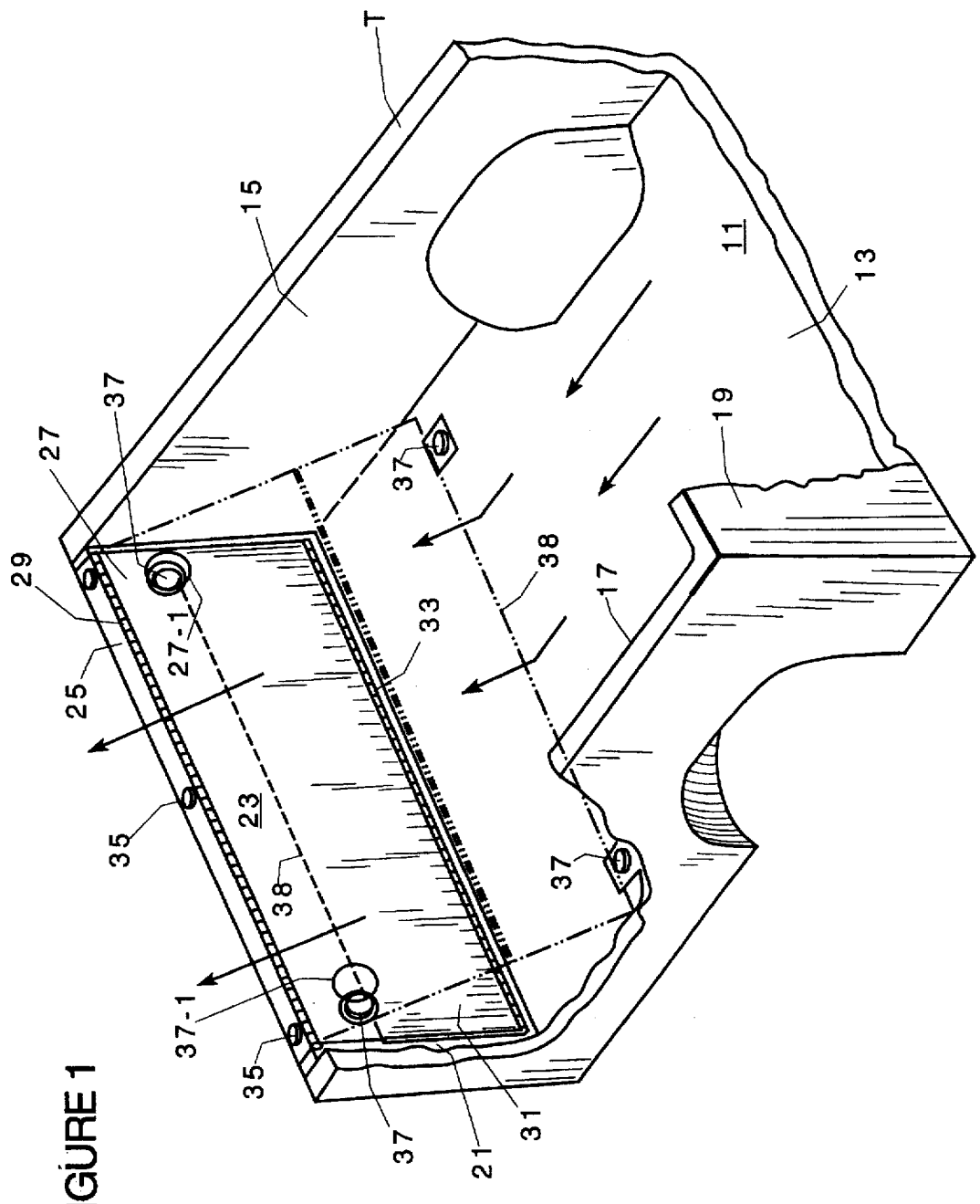
FIG. 1 is a pictorial view of a wind deflector constructed according to this invention, the wind deflector being shown mounted on the tailgate of a truck in an open position and also shown mounted on the tailgate in a collapsed position.

Referring now to the drawings there is shown in FIG. 1 a fragmentary pictorial view of the bed 11 of an open top pickup truck T. Bed 11 includes a floor 13, a pair of sidewalls 15 and 17, a front wall 19 and a tailgate 21.

A wind deflector 23 constructed according to the teachings of this invention is mounted in bed 11. Wind deflector 23 is shown in a folded form, i.e. in solid lines, and in an extended form, i.e. in dotted lines. Wind deflector 23 includes a top plate 25, a first panel 27 connected to top plate 25 by a first hinge 29 and a second panel 31 connected to first panel 27 by a second hinge 33. Plate 25 and panels 27 and 31 may be made of metal or plastic. Top plate 25 is mounted on top of tailgate 21 by bolts 35 which extend through holes (not shown) on top of tailgate 21 and secured by nuts (not shown). A pair of locking knobs 37 are hingedly attached to the unattached edge 38 of second panel 31 for use in removably securing panel 31 to either tailgate 21 when wind deflector 23 is in a folded position or to floor 13 of bed 11 when wind deflector 23 is in an open position. A pair of holes (not shown) are provided on tailgate 21 for engaging knobs 37 when wind deflector 23 is folded and a pair of holes (not shown) are provided on floor 23 for engaging knobs 37 when wind deflector 23 is opened. When wind deflector 23 is folded, second panel 31 is sandwiched between first panel 27 and tailgate 21 and knobs 37 extend out through holes 27-1 on panel 27.

When wind deflector 23 is in an open position, as shown by the dotted lines, wind created in truck bed 11 as truck T moves is diverted up as shown by the arrows. As can also be seen, when wind deflector 23 is in an open position a storage compartment 38 is created in the space between opened wind deflector 23 and tailgate 21 into which tools or other items may be kept.

Locking knobs 37 may be accessed when wind deflector 23 is in a closed position through holes 27-1 formed in panel 27.

As can be appreciated, wind deflector 23, when being opened, gives truck T more stability and also will cause a reduction in fuel consumption.

Figure 2:
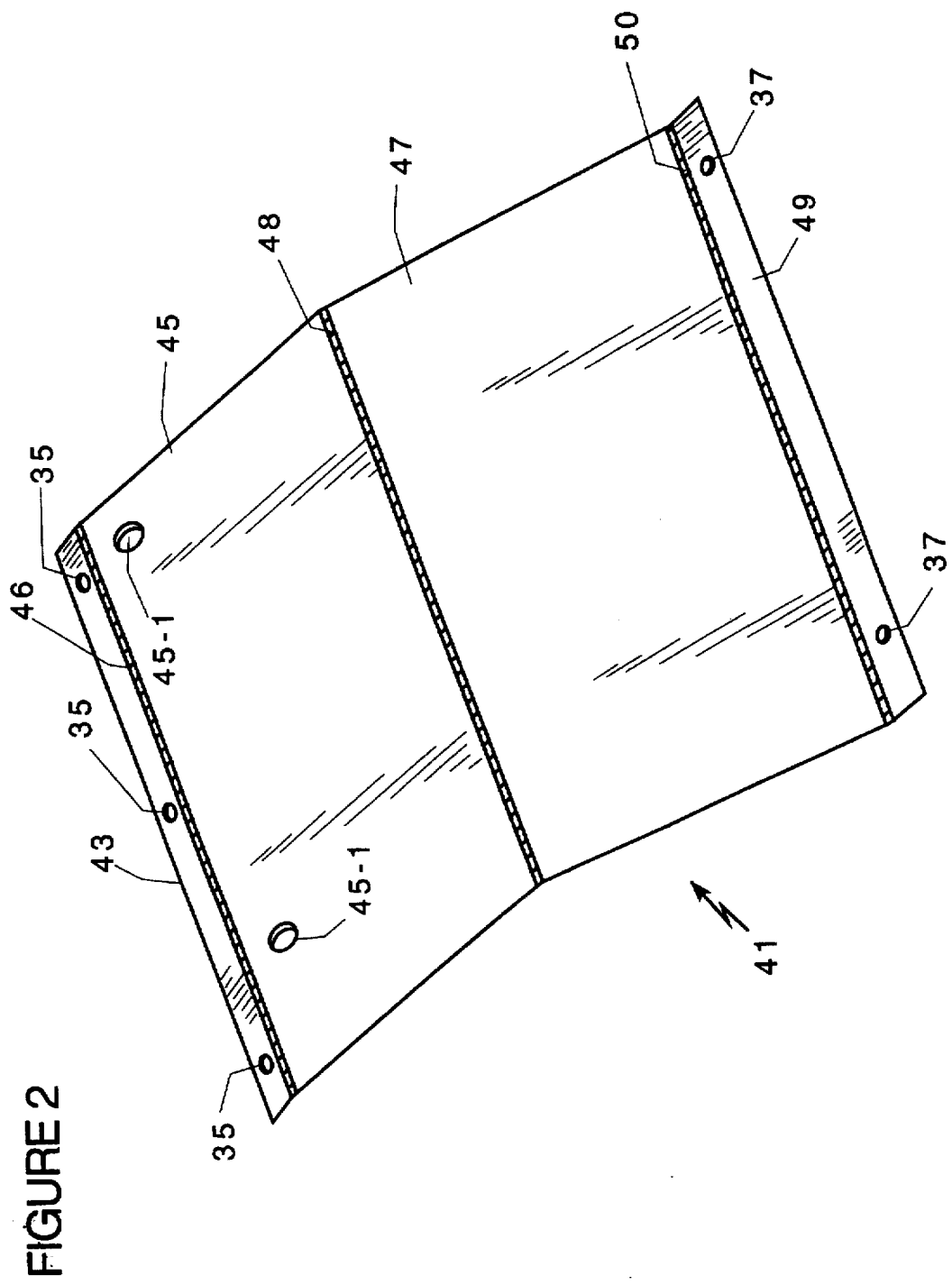
FIG. 2 is a pictorial view of another version of a wind deflector constructed according to this invention.

In FIG. 2 is shown another version of a wind deflector according to this invention, the deflector being identified by reference numeral 41. Wind deflector 41 includes a top plate 43, a first panel 45 having holes 45-1 for the same purpose as holes 27-1 in wind deflector 23 hingedly connected thereto by a hinge 46, a second panel 47 hingedly connected to first panel 45 by a hinge 48 and a bottom plate 49 hingedly connected to second panel 47 by a hinge 50. Plates 43 and 49 and panels 45 and 47 are all made of metal or plastic. Wind deflector 41 is sized so that it will extend over the wheel wells of a typical truck T when opened as shown. Wind deflector 41 also includes bolts 35 and locking knobs 37.

What is claimed is:

1. A wind deflector for dispersing the wind out of the truck bed of an open top pickup truck during movement thereof, the truck bed including a floor, a pair of spaced apart sidewalls, a front wall and a tailgate, said wind deflector comprising:

a. a top plate, b. means on said top plate for securing the top plate to the tailgate, c. a first panel hingedly connected to the top plate, d. a second panel hingedly connected to said first panel, and e. means for removably securing said second panel to either said tailgate or floor of said truck bed.

2. A wind deflector for dispersing the wind out of the truck bed of an open top pickup truck, the truck bed including a floor, a pair of spaced apart sidewalls and a tailgate, said wind deflector comprising:

a. a sheet of material having top portion shaped to fit over the top of the tailgate and a bottom portion extending down onto the floor of the truck bed, b. means for securing the top portion to the tailgate, and c. means for removably securing said bottom portion to the floor of said truck bed.

\* \* \* \* \*